United States Patent Office 2,823,213
Patented Feb. 11, 1958

2,823,213

ORGANIC COMPOUNDS

David Neville Kirk, Vladimir Petrow, Isobel Ann Stuart-Webb, and Dady Kawashaw Patel, London, England, assignors to The British Drug Houses Limited, London, England, a British company No Drawing. Application December 11, 1956
Serial No. 627,568

Claims priority, application Great Britain January 3, 1956

9 Claims. (Cl. 260—397.4)

This invention is for improvements in or relating to organic compounds, and has particular reference to a new and improved method for the preparation of 6-hydroxy-3:5-cyclopregnan-20-one (III; R=H), which is of considerable value in the treatment of certain metal disorders.

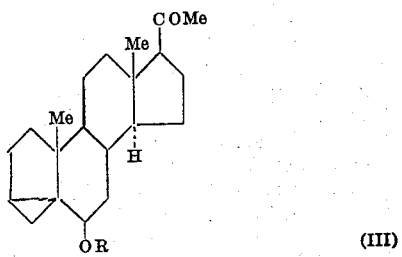

(III)

Copending application No. 624,231, filed November 26, 1956, by Vladimir Petrow, Isobel Ann Stuart-Webb and Dady Kawashaw Patel, directed to 6-hydroxy-3:5-cyclopregnan-20-one (III; R=H) describes methods for the preparation of that compound which methods utilise a pregnenolone sulphate or arylsulphonate as starting material.

The pregnenolone required for making the sulphate or arylsulphonate is generally itself prepared by catalytic hydrogenation of 16-dehydropregnenolone (I; R=H), which is a relatively cheap and abundant steroid raw material.

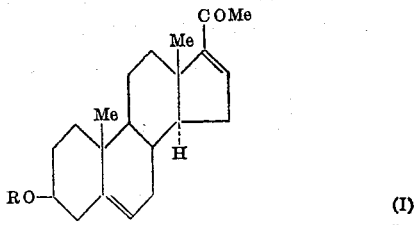

(I)

We have found that 16-dehydropregnenolone (I; R=H) may be converted into a new intermediate 6-hydroxy-3:5-cyclopregn-16-en-20-one (II; R=H) in high yield. This intermediate has therapeutic properties.

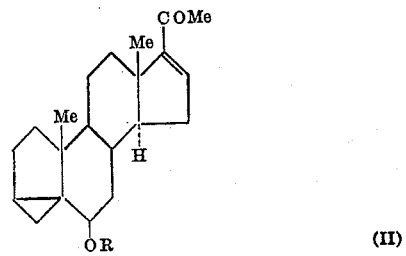

(II)

We have also found that the new compound 6-hydroxy-3:5-cyclopregn-16-en-20-one (II; R=H) may be converted in very high yield into the saturated cyclo-steroid (III; R=H) by catalytic hydrogenation in the absence of mineral acids. The acetyl derivative of the new compound may be similarly catalytically hydrogenated.

The invention accordingly provides the new compounds 6-hydroxy-3:5-cyclopregn-16-en-20-one and 6-acetoxy-3:5-cyclopregn-16-en-20-one.

The invention also provides a new and improved process for the preparation of 6-hydroxy-3:5-cyclopregnan-20-one (III; R=H) which process comprises converting 16-dehydropregnenolone (I; R=H) or a derivative thereof into 6 - hydroxy - 3:5 - cyclopregn - 16 - en - 20 - one (II; R=H), followed by catalytic hydrogenation.

According to a modification of this process the intermediate 6-hydroxy-3:5-cyclopregn-16-en-20-one may be acetylated, the acetyl derivative catalytically hydrogenated, and the product hydrolysed to 6-hydroxy-3:5-cyclopregnan-20-one.

Conversion of 16-dehydropregnenolone (I; R=H) into the new 6 - hydroxy - 3:5 - cyclopregn - 16 - en - 20 - one (II; R=H) may be achieved by processes similar to those described in the aforementioned co-pending Application No. 624,231 for the conversion of pregnenolone derivatives into (III; R=H).

The preferred process for effecting the rearrangement of compound I (R=H) to compound II (R=H) comprises converting 16-dehydropregnenolone (I; R=H) into an arylsulphonate (I; R=Aryl.SO$_2$.), followed by hydrolysis of the arylsulphonate under weakly alkaline conditions and in an aqueous organic solvent medium.

16 - dehydropregnenolone benzene sulphonate (I; R=Ph.SO$_2$.) is the preferred arylsulphonate but other arylsulphonates such as, for example, 16-dehydropregnenolone toluene p-sulphonate (I; R=p-Me.C$_6$H$_4$.SO$_2$.) may also be employed.

Conversion of the 16-dehydropregnenolone arylsulphonate into 6-hydroxy-3:5-cyclopregn-16-en-20-one (II; R=H) may be effected by heating the arylsulphonate with aqueous organic solvent mixtures and in the presence of a basic salt. Potassium acetate is the preferred basic salt. Aqueous acetone, aqueous methyl ethyl ketone and aqueous dioxan are the preferred aqueous organic solvent mixtures.

Conversion of 6-hydroxy-3:5-cyclopregn-16-en-20-one (II; R=H) into the saturated 6-hydroxy-3:5-cyclopregnan-20-one (III; R=H) may be effected by catalytic hydrogenation in an organic or aqueous organic solvent mixture and in the absence of a mineral acid. Raney nickel is the preferred catalyst for this hydrogenation, but other catalysts such as, for example, palladium on calcium carbonate, may also be employed. Catalytic hydrogenation of the free alcohol (II; R=H) may be employed. Alternatively catalytic hydrogenation of an acetyl derivative of (II; R=H) to give an acetyl derivative of (III; R=H), followed by alkaline hydrolysis of the acetyl derivative of (III; R=H) to give 6-hydroxy-3:5-cyclopregnan-20-one (III; R=H), may be employed.

Following is a description by way of example of methods of carrying the invention into effect.

*Example I*

16 - dehydropregnenolone benzenesulphonate (I; R=Ph.SO$_2$).—16-dehydropregnenolone (I; R=H) (2 g.) in pyridine (20 ml.) was treated with benzene sulphonyl chloride (2 ml.) and the mixture left at room temperature overnight. After pouring into water the precipitated solids were collected, washed with water and dried. Crystallisation from acetone gave 16-dehydropregnenolone benzenesulphonate as needles or plates, M. P. 152 to 153° C., $[\alpha]_D^{24}$ —31° (c, 0.3244 in chloroform).

6 - hydroxy - 3:5 - cyclopregn - 16 - en - 20 - one (II; R=H).—16 - dehydropregnenolone benzenesulphonate (1.85 g.) in acetone (35 ml.) and water (35 ml.) was heated with potassium acetate (2.1 g.) under reflux for 4½ hours. After dilution with water the product was isolated with chloroform and purified from acetone.

6 - hydroxy - 3:5 - cyclopregn - 16 - en - 20 - one (II; R=H) formed clusters of prisms, M. P. 137 to 139° C., $[\alpha]_D^{27}+90°$ (c, 0.44 in chloroform).

*Example II*

*16 - dehydropregnenolone toluene p - sulphonate* (I; R=p-Me.C₆H₄.SO₂).—Pregnadienolone (7.8 g.) dissolved in pyridine (100 ml.) was left at room temperature overnight with toluene-p-sulphonyl chloride (7.8 g.). Water was added and the precipitate collected, washed with water and dried. Crystallisation from acetone gave 16 - dehydropregnenolone - toluene p - sulphonate, M. P. 158° C. 6 - hydroxy - 3:5 - cyclopregn - 16 - en - 20 - one (II; R=H). 16 - dehydropregnenolone toluene p-sulphonate (10 g.) in acetone (140 ml.) and water (140 ml.) was heated with potassium acetate (11 g.) under reflux for 5 hours. Acetone was removed by distillation and the product isolated with ether/chloroform (4:1). Crystallisation from acetone/hexane furnished (II; R=H), M. P. and mixed M. P. identical with a sample prepared as described under Example I.

*Example III*

*6 - acetoxy - 3:5 - cyclopregn - 16 - en - 20 - one.*—Acetylation of (II; R=H) with acetic anhydride/pyridine at room temperature followed by crystallisation of the product from ether/hexane furnished 6-acetoxy-3:5-cyclopregn - 16 - en - 20 - one (II; R=Ac), prisms, M. P. 143 to 145° C., $[\alpha]_D^{21}+80.3°$ (c, 1.02 in chloroform).

*Example IV*

*6 - hydroxy - 3:5 - cycvlopregnan - 20 - one.*—6 - hydroxy - 3:5 - cyclopregn - 16 - en - 20 - one (II; R=H) (800 mg.) in water/methanol (1:9; 80 ml.) was catalytically hydrogenated over 2% palladium on calcium carbonate (200 mg.) at atmospheric pressure. Absorption of 1 molar equivalent of hydrogen was complete in circa. 45 minutes. After removal of the catalyst by filtration through "Hyflo," the solution was evaporated to dryness under reduced pressure and the residue crystallised from acetone to give 6-hydroxy-3:5-cyclopregnan-20-one, M. P. 180 to 181° C., not depressed on admixture with an authentic sample.

*Example V*

*6 - hydroxy - 3:5 - cyclopregnan - 20 - one.*—6 - acetoxy - 3:5 - cyclopregn - 16 - en - 20 - one (2.50 g.) in methanol (100 ml.) was catalytically hydrogenated over Raney nickel (1 ml. of suspension in methanol) at atmospheric pressure. After absorption of 1 molar equivalent of hydrogen the solution was filtered to remove the catalyst and the filtrate evaporated to dryness under reduced pressure. Crystallisation of the residue from methanol furnished 6 - acetoxy - 3:5 - cyclopregnan - 20 - one (III; R=Ac), M. P. 140 to 142° C. not depressed on admixture with an authentic sample. The product was hydrolysed to 6-hydroxy-3:5-cyclopregnan-20-one.

We claim:

1. A process for the preparation of 6-hydroxy-3:5-cyclopregnan-20-one said process comprising converting 16-dehydropregnenolone into 6-hydroxy-3:5-cyclopregn-16-en-20-one followed by catalytic hydrogenation.

2. A process for the preparation of 6-hydroxy-3:5-cyclopregnan-20-one said process comprising converting 16-dehydropregnenolone into 6-hydroxy-3:5-cyclopregn-16-en-20-one, acetylating said 6-hydroxy-3:5-cyclopregn-16-en-20-one, catalytically hydrogenating said acetyl derivative and hydrolysing said resulting product.

3. A process for the preparation of 6-hydroxy-3:5-cyclopregn-16-en-20-one said process comprising converting 16-dehydropregnenolone into an arylsulphonate and hydrolysing said arylsulphate under weakly alkaline conditions and in an aqueous organic solvent medium.

4. A process for the preparation of 6-hydroxy-3:5-cyclopregn-16-en-20-one said process comprising converting 16-dehydropregnenolone into 16-dehydropregnenolone benzene sulphonate and heating said benzene sulphonate in acetone and water with potassium acetate under reflux for about 4½ hours.

5. A process for the preparation of 6-hydroxy-3:5-cyclopregn-16-en-20-one said process comprising converting 16-dehydropregnenolone into 16-dehydropregnenolone toluene p-sulphonate and heating said toluene p-sulphonate in acetone and water with potassium acetate under reflux for about 5 hours.

6. A process for the preparation of 6-hydroxy-3:5-cyclopregn-20-one said process comprising catalytically hydrogenating 6-hydroxy-3:5-cyclopregn-16-en-20-one in water/methanol over 2% palladium on calcium carbonate at atmospheric pressure.

7. A process for the preparation of 6-hydroxy-3:5-cyclopregn-20-one said process comprising catalytically hydrogenating 6-hydroxy-3:5-cyclopregn-16-en-20-one in methanol over Raney nickel at atmospheric pressure.

8. 6-hydroxy-3:5-cyclopregn-16-en-20-one.

9. 6-acetoxy-3:5-cyclopregn-16-en-20-one.

No references cited.